United States Patent
Oomori et al.

[11] Patent Number: 5,644,092
[45] Date of Patent: Jul. 1, 1997

[54] APPARATUS FOR INSPECTING THE ATTACHED STATE OF SLIDE FASTENER STOP BOXES AND STOP BOXES ATTACHING MACHINE EQUIPMENT WITH THE SAME

[75] Inventors: Shigenori Oomori; Michio Ito, both of Toyama-ken, Japan

[73] Assignee: YKK Corporation, Tokyo, Japan

[21] Appl. No.: 315,358

[22] Filed: Sep. 30, 1994

[30] Foreign Application Priority Data

Oct. 13, 1993 [JP] Japan .................. 5-255629

[51] Int. Cl.⁶ .................................. G01M 19/00
[52] U.S. Cl. .................. 73/865.8; 73/865.9; 29/767
[58] Field of Search ................... 73/865.8, 865.9; 29/766, 767, 33.2, 34 A

[56] References Cited

U.S. PATENT DOCUMENTS

| | | | |
|---|---|---|---|
| 4,545,118 | 10/1985 | Fisher et al. | 29/768 |
| 4,631,818 | 12/1986 | Sassa et al. | 29/33.2 |
| 4,671,122 | 6/1987 | Igarashi | 73/865.8 |
| 4,697,319 | 10/1987 | Umino | 29/33.2 |

FOREIGN PATENT DOCUMENTS

| | | |
|---|---|---|
| 0181484 | 5/1986 | European Pat. Off. |
| 0396373 | 11/1990 | European Pat. Off. |
| 3145411 | 7/1982 | Germany . |

*Primary Examiner*—Hezron E. Williams
*Assistant Examiner*—Nashmiya Ashraf
*Attorney, Agent, or Firm*—Hill, Steadman & Simpson

[57] ABSTRACT

An apparatus for continuously inspecting the attached states of successive bottom stop boxes attached to separable slide fasteners, which has a pair of tape grip members movable forwardly and backwardly along a travelling path of a fastener tape to which the individual bottom stop box is attached. The tape grip members are situtated upwardly and downwardly of the fastener tape travelling path in confronting relationship, each of which being pivotally movable about the horizontal axis extending through its central portion. The tape grip members have their upstream ends urged toward each other, and an air cylinder for forcedly turning their downstream ends toward and away from each other. The apparatus has a moving body situated on one side of the grip members for moving forwardly and backwardly together with the grip members, a contact member situated in a fixed position in a path of movement of the moving body and normally urged toward the moving body by a predetermined resilience, and a sensor for detecting an amount of movement of the grip members when the moving body is moved to a predetermined length against the predetermined resilience in contact with the contact member.

6 Claims, 5 Drawing Sheets

APPARATUS FOR INSPECTING THE ATTACHED STATE OF SLIDE FASTENER STOP BOXES AND STOP BOXES ATTACHING MACHINE EQUIPMENT WITH THE SAME

BACKGROUND OF THE INVENTION

1. Field of the Invention

This invention relates to an apparatus for continuously inspecting the degree of firmness at which an individual bottom stop box is attached to a separable slide fastener, and a separable slide fastener bottom stop box attaching machine, for a separable slide fastener manufacturing system, which is equipped with the inspecting apparatus.

2. Description of the Related Art

U.S. Pat. No. 4,671,122 discloses an apparatus for inspecting the attached state of a separable slide fastener bottom stop box by inserting inspecting projections into notches which are clinched previously to attach the bottom stop box to a box pin and then detecting the depth of insertion after the box pin fixed to one fastener tape and an insertion pin fixed to the other fastener tape are inserted into a metallic box and, at the same time, the notches are clinched.

A method of attaching a thermoplastic synthetic resin box by ultrasonic welding is disclosed in Japanese Patent Publication No. SHO 63-40088. In the attaching method, the welded state of the box and the box pin are inspected in terms of melting and smashing of the projection previously formed on the box surface.

In the method for inspection in terms of depth of clinching notches, since the notches are deformed after the box has been attached, the appearance of the resulting separable bottom stop would be remarkably deteriorated. On the other hand, in the method for inspection in terms of degree of melting and smashing of the projection, partly since the melted projection on the box surface deteriorates the appearance of the separable bottom stop, and partly since the attached state of the box is estimated indirectly from the degree of melting and smashing of the projection, reliable inspection is difficult to achieve.

It is an object of this invention to provide an inspecting apparatus for directly inspecting the degree of firmness of attachment of a separable slide fastener bottom stop box without deteriorating its appearance after attaching the box, and a separable slide fastener bottom stop box attaching machine equipped with the inspecting apparatus for reliably grasping the attached state of the box.

SUMMARY OF THE INVENTION

In order to accomplish the above object, according to a first aspect of the invention, there is provided an apparatus for continuously inspecting the attached states of successive bottom stop boxes attached to separable slide fasteners, comprising a pair of tape grip members movable forwardly and backwardly along a travelling path of a fastener tape to which the individual bottom stop box is attached. The tape grip members are situated upwardly and downwardly of the fastener tape travelling path in confronting relationship, each of the tape grip members being pivotally movable about the horizontal axis extending through its central portion. The tape grip members have urging means for normally urging their upstream ends toward each other, and forced turning means for forcedly turning their downstream ends toward and away from each other. The apparatus further comprises a moving body situated on one side of the grip members for moving forwardly and backwardly together with the grip members, a contact member situated in a fixed position in a path of movement of the moving body and normally urged toward the moving body by a predetermined resilience, and detecting means for detecting an amount of movement of the grip members when the moving body is moved to a predetermined length against the predetermined resilience in contact with the contact member.

According to a second aspect of the invention, there is provided a separate slide fastener bottom stop box attaching machine equipped with an inspecting apparatus as described above, comprising a pair of gripping tips on respective upstream ends of the grip members for gripping the fastener tapes from their upper and lower sides; a movement restricting member for restricting the upstream movement of the grip members; forward feeding means situated downstream of the grip members for forwardly feeding the fastener chain intermittently; a box attaching unit situated near to and upstream of the movement restricting member; backward feeding means situated upstream of the box attaching unit; and controlling means for actuating the forced turning means to cause the gripping tips to forcedly grip the fastener tapes while the box is supplied to the box attaching unit, and also for actuating the backward feeding means and opening the gripping tips when the box is attached to the fastener tapes.

With the separable slide fastener bottom stop box attaching machine, when the forward feeding means is driven to feed the fastener chain forwardly by a length equal to the length of a single slide fastener, the forced turning means of the inspecting apparatus becomes operative to open the upper and lower gripping tips of the grip members so that the fastener chain can freely travel in the inspecting apparatus. With continued feeding of the fastener chain, an element-free space portion to which a box is to be attached is detected and a detection signal is sent to the control unit in order to form cutaways in the tapes with a predetermined time difference. Simultaneously, the forward feeding means is stopped and the forced turning means is operative to close the upper and lower gripping tips of the gripper members to grip the opposite fastener tapes of the fastener chain firmly. Then, a box is supplied to the box attaching position from a box supplying unit and stays in such position. When the box is supplied to the box attaching position, the backward feeding means becomes operative to backwardly feed the fastener chain together with the inspecting apparatus.

When the fastener chain is backwardly fed, the inspecting apparatus firmly gripping the fastener chain is also moved simultaneously. The movement restricting member is situated in such a position that the box can be supplied to the position where the box is attached. When the inspecting apparatus is brought into contact with the movement restricting member, the backward feeding means is stopped with the fastener chain in a predetermined tension. During this backward feeding, the box staying in the waiting position will be threaded onto the fastener tapes from the cutaways, and then an insertion pin and a box pin are inserted into the box. Since the fastener chain has a predetermined tension when the insertion pin and the box pin are inserted into the box, it is possible to enable smooth insertion of the insertion pin and box pin without spreading the opposite tapes at the element-free space portion. Then the box attaching machine will be operative to weld the box and box pin together.

When the box and box pin are welded together, the backward feeding means releases the gripppping of the fastener chain and, at the same time, the forced turning means of the inspecting apparatus becomes inoperative so that the fastener tapes are gripped by the upper and lower gripping tips under the resilience of urging means (the spring). This resilience of the spring is determined to such a low degree that the fastener chain can travel between the upper and lower gripping tips when it is fed by the forward feeding means (chain feed rollers). Then the forward feeding means becomes operative to feed the fastener chain. At that time, the fastener chain will slide between the upper and lower gripping tips. During the feeding of the fastener chain, the attached box will come into contact with end surfaces of the grip members between the horizontally opposite gripping tips to move the inspecting apparatus with the fastener chain forwardly. During the moving of the inspecting apparatus, the moving body comes into contact with the contact member and keeps moving forwardly a predetermined distance with the contact member against a predetermined resilience. When the moving body is detected by the displacement-of-grip-member detecting means as it has moved forwardly a predetermined distance, the detecting means will send a detection signal to the control unit to actuate the forced turning means of the inspecting apparatus so that the upper and lower gripping tips of the grip members will spread against the resilience of the spring, thus allowing the box to pass freely between the upper and lower gripping tips. At that time, since the resilient force of the compressed spring exerts on the moving body, the inspecting apparatus is resiliently moved backwardly via the moving body and the fastener chain is fed forwardly. The backwardly moved inspecting apparatus then collides against the movement restricting member and will stay there until the next inspection.

The foregoing is the case where the attaching of the box is complete. Assuming that the attaching of the box is incomplete, when the forward feeding means starts feeding the fastener chain, the fastener tapes slide between the upper and lower gripping tips as described above. During the feeding of the fastener chain, when the box welded to the box pin comes into contact with the end surfaces of the grip members between the horizontally opposite gripping tips, the non-secured box is removed instantly from the fastener chain. If the attachment of the box is not firm enough, the box with the fastener chain will be moved forwardly in contact with the inspecting apparatus, however, when the moving body comes into contact with the contact member during the forward moving of the box, the box is removed from the fastener chain and solely the fastener chain is fed. When the box is thus removed from the fastener chain, it will be detected by a non-illustrated suitable detecting means and marking will be made by a non-illustrated known marking unit before feeding to the next station.

DETAILED DESCRIPTION

Figure 1:
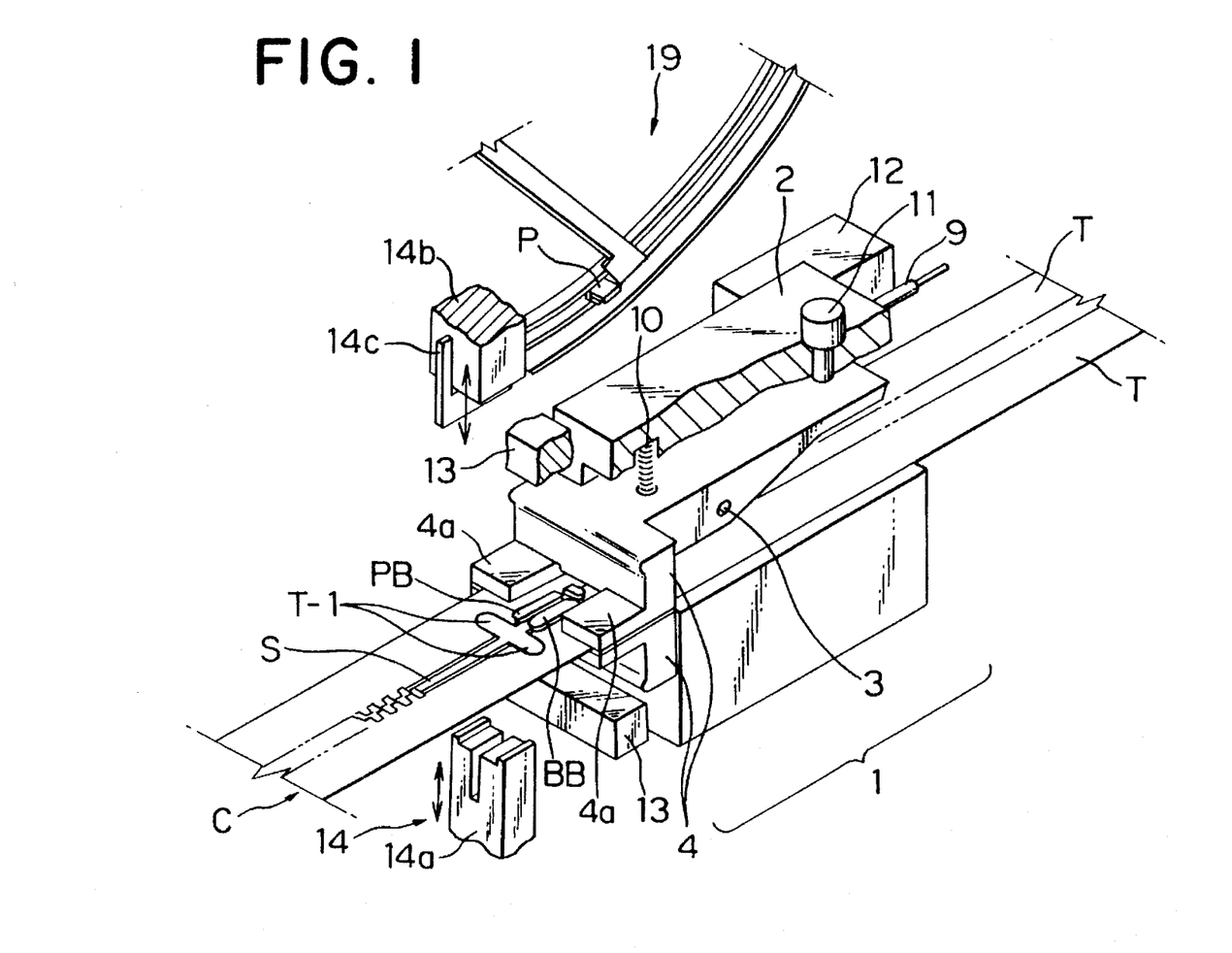
FIG. 1 is a fragmentary perspective view of a typical embodiment of a box attaching machine, for successively attaching separable bottom stop boxes to a fastener chain, which is equipped with an apparatus for inspecting the attached state of boxes, according to this invention.
Figure 2:
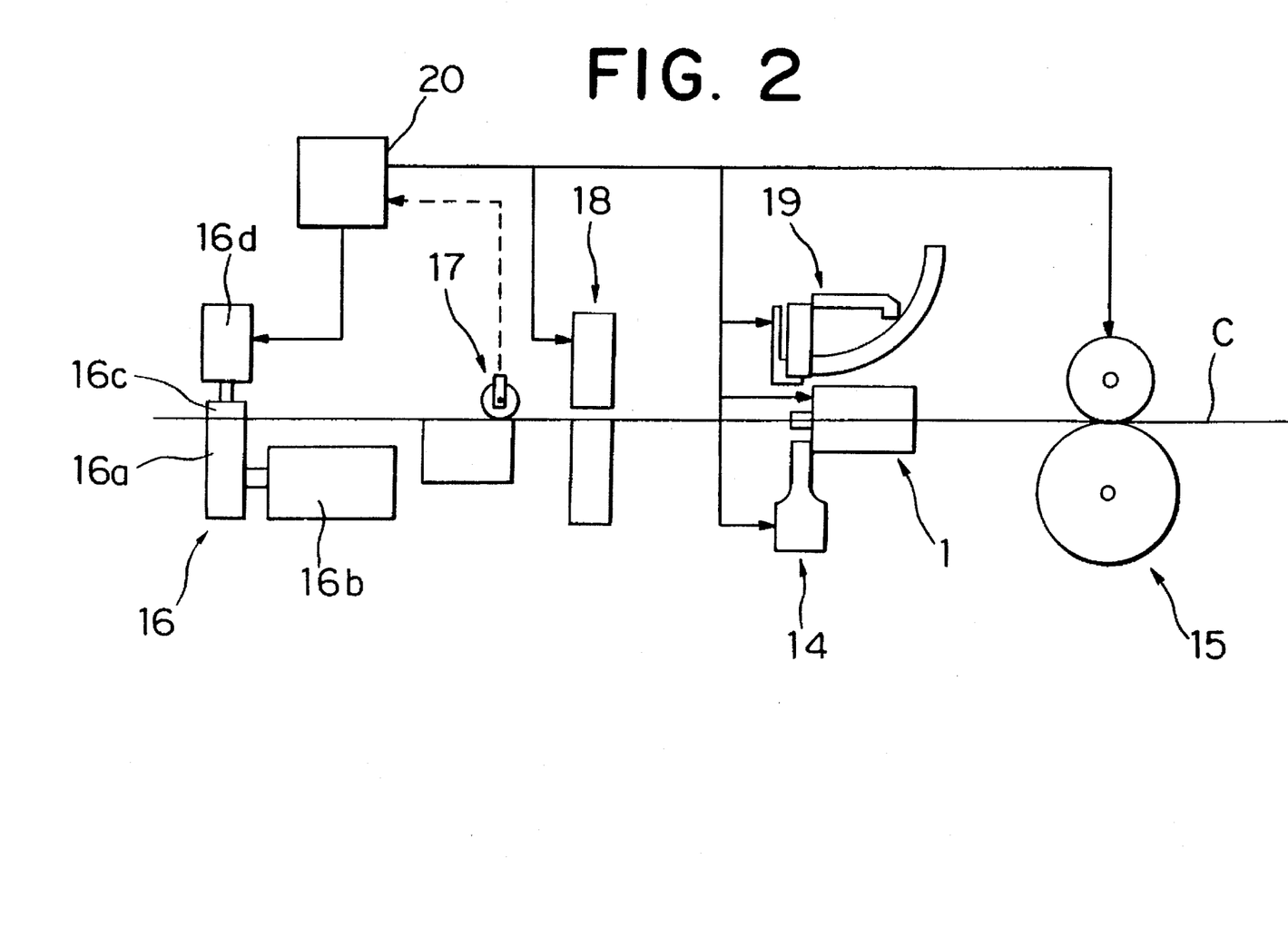
FIG. 2 is a schematic view showing the arrangement of constituent parts of the box attaching machine.
Figure 3:
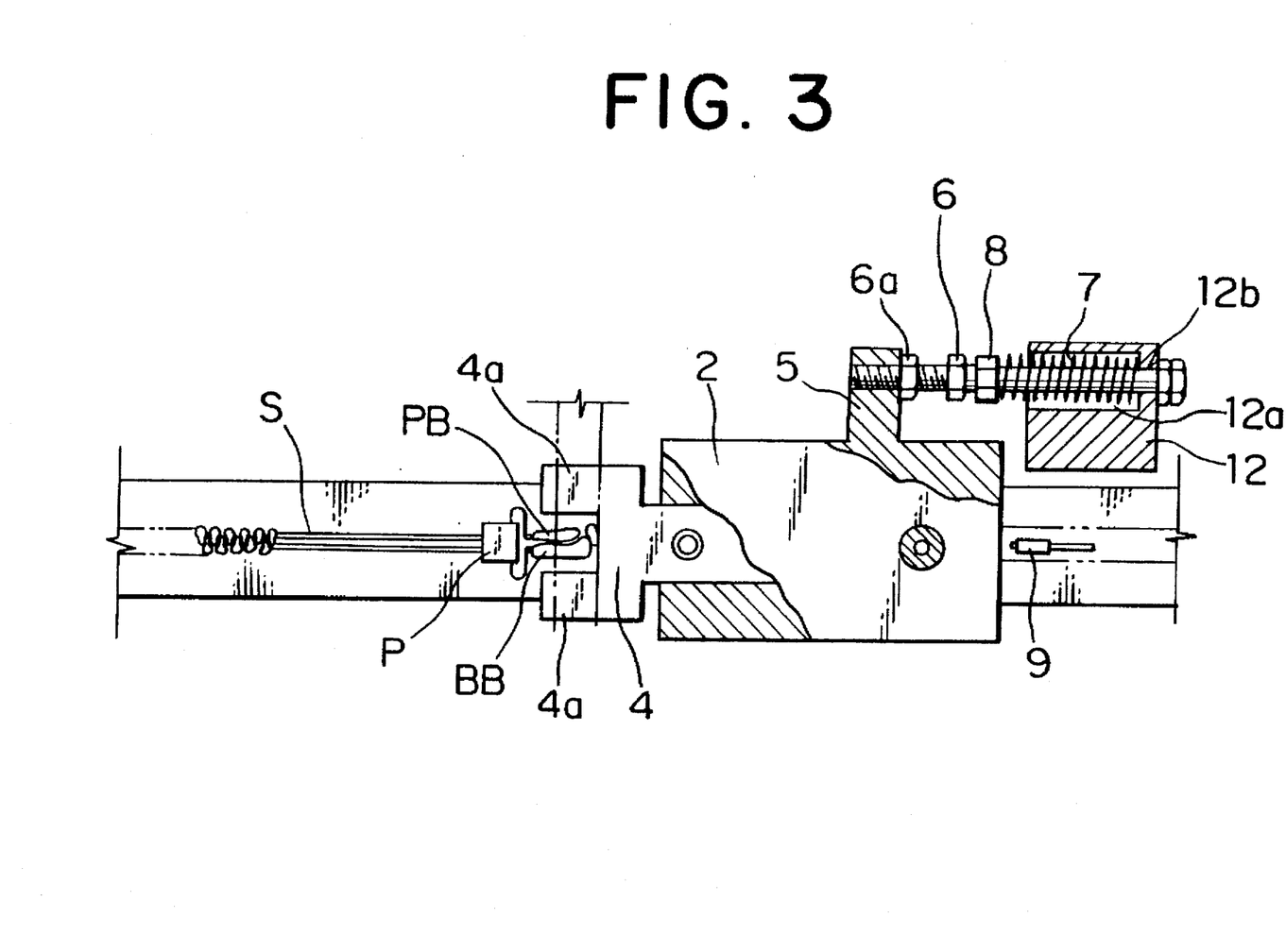
FIG. 3 is a plan view, with parts broken away, of the box attaching machine, showing the manner in which the fastener tapes are gripped by the inspecting apparatus.
Figure 4:
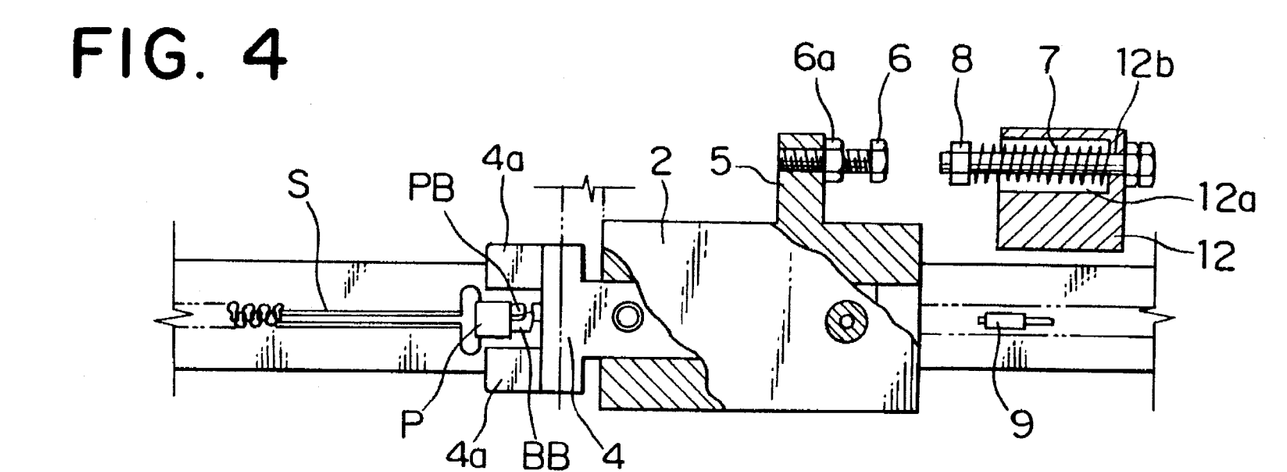
FIG. 4 is a plan view, with parts broken away, of the box attaching machine, showing the manner in which the fastener tapes with the inspecting apparatus are moved backwardly.
Figure 5:
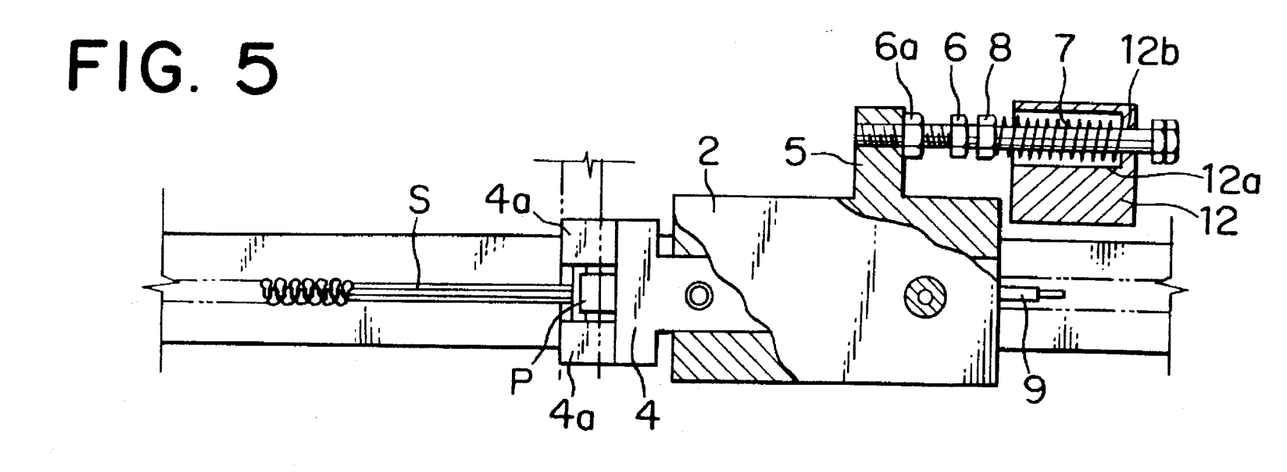
FIG. 5 is a plan view, with parts broken away, of the box attaching machine, showing the manner in which the inspecting apparatus is moved forwardly as being pushed by the box.
Figure 6:
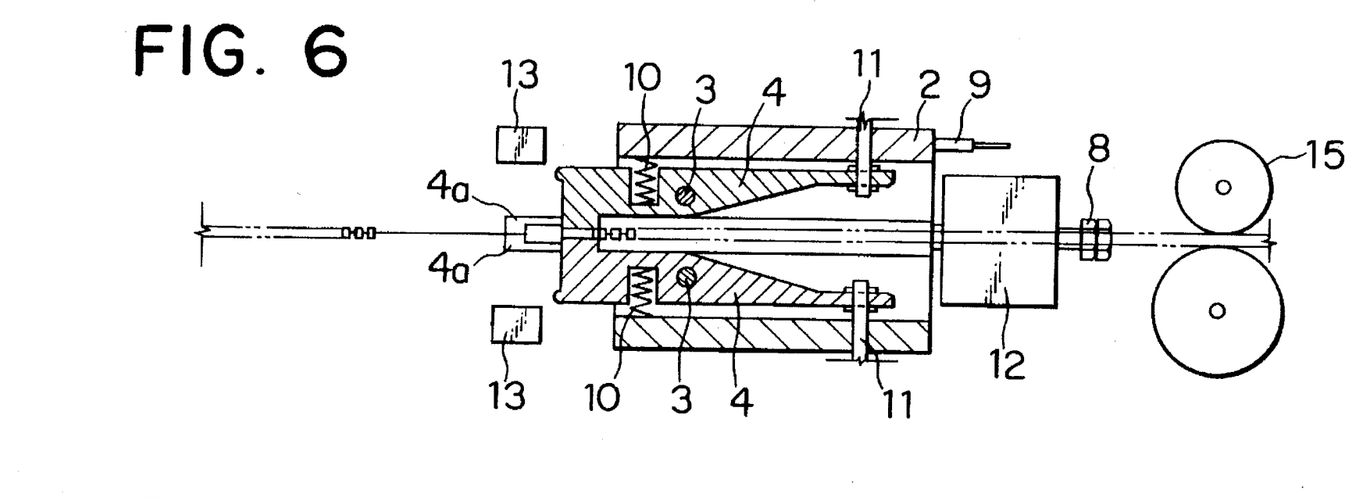
FIG. 6 is a vertical cross-sectional view, with parts broken away, of the box attaching machine, showing the manner in which the inspecting apparatus is moved forwardly as being pushed by the box.
Figure 7:
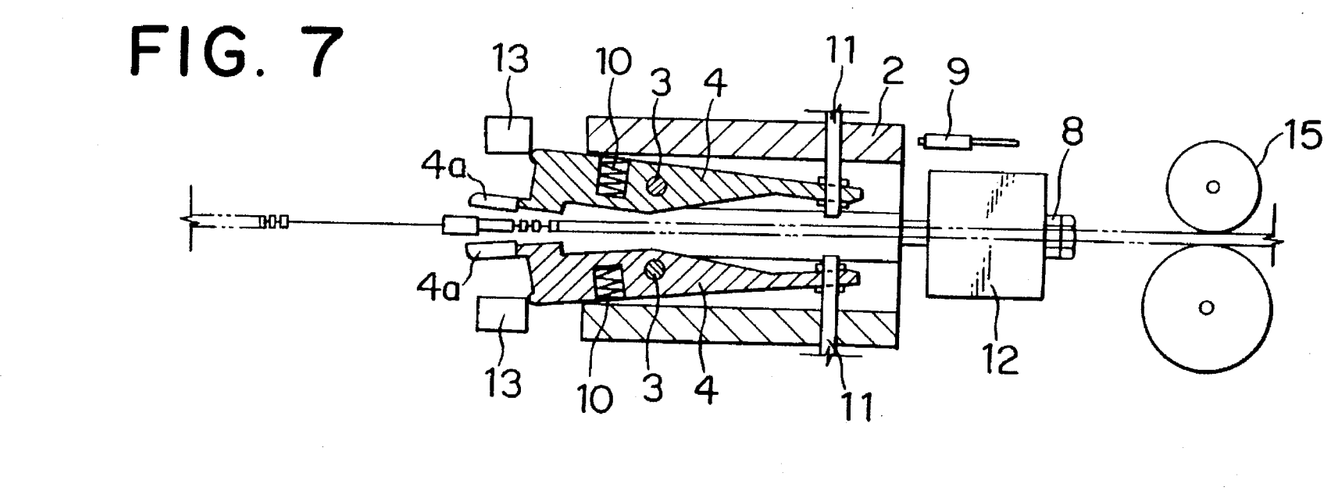
FIG. 7 is a vertical cross-sectional view, with parts broken away, of the box attaching machine, showing the inspecting apparatus after inspection has been completed.

A typical embodiment of this invention will now be described in detail with reference to the accompanying drawings. FIG. 1 is a fragmentary perspective view of a box attaching machine, for continuously attaching separable bottom end boxes to a fastener chain, which is equipped with an inspecting apparatus for inspecting the attached state of the individual separable bottom end box. FIG. 2 is a schematic view showing the arrangement of constituent parts of the box attaching machine. FIGS. 3 through 5 are plan views, with parts broken away, of the box attaching machine, showing the operation of the machine. And FIGS. 6 and 7 are vertical cross-sectional views of the box attaching machine.

The inspecting apparatus 1 comprises upper and lower grip members 4 which are vertically oppositely arranged in a tunnel-shape casing 2 in a travelling path of a pair of horizontally opposed fastener tapes T of a fastener chain C with boxes attached. Each of the grip memers 4 is pivoted at its central portion by a horizontal shaft 3. The inspecting apparatus also comprises a moving body 6 attached to a side portion of the casing 2 parallel to it via a bracket 5, a contact member 8 which is situated in a fixed position in alignment with one end of the moving body 6 and which is normally urged toward the moving body 6 under a predetermined resilience of s compression spring 7, and a detector 9, such as a microswitch or a light detector, for detecting the extent of movement of the grip members 4 at the fixed position when the moving body 6 pushes the contact member 8 and moves a predetermined distance against the resilience of the spring 7.

The casing 2 can be freely movable forwardly and backwardly along the travelling path of the fastener tapes T in a non-illustrated locus. Each of the grip members 4 has on its upstream end a horizontal pair of gripping tips 4a and has a varying thickness decreasing gradually from the central portion to the downstream end in such a manner that confronting surfaces of the grip members 4 are remote from each other gradually toward the downstream end. A compression spring 10 is situated between the upstream end of each grip member 4 and the casing 2. To the downstream end of each grip member 4, the end of a rod of an air cylinder 11 mounted on the casing 2 is fixed. Therefore, when the air cylinder 11 is in a free state, the upper and lower grip members 4 angularly move about the respective horizontal shafts 3 by the respective compression springs 10 to resiliently catch the fastener tapes between the upper and lower gripping tips 4a. When the air cylinder 11 is operative to shrink the rod, the upper and lower gripping tips 4a grips the fastener tapes firmly. If the air cylinder 11 is operative to expand the rod, the upper and lower gripping tips 4a are removed from the fastener tapes to allow the fastener tapes T to travel freely.

The moving body 6 is a bolt, and the position of its head is adjustable by adjusting the extent to which the bolt is threaded into the bracket 5. Reference numeral 6a designates a nut for fixing the head position of the bolt 6. The contact member 8 situated in confronting relationship with the head of the bolt 6 is a bar having a head at each of opposite ends. As shown in FIGS. 3 through 7, the contact member 8 is slidably inserted into a recessed portion 12a having a through hole 12b at a bottom portion and formed on a block body 12 located in a fixed position. The contact member 8 is normally urged toward the head of the bolt 6 under a predetermined resilience of the compression spring 7 received in the recessed portion 12a. The detector 9 for detecting the extent of movement of the grip members 4 sends a detection signal to a non-illustrated drive for the air cylinder 11 to cause the air cylinder 11 to be operative or inoperative as described above.

With even solely the inspecting apparatus of this invention, it is possible to inspect the attached state of each of successive separable bottom stop boxes attached to a fastener chain or a separable slide fastener. The box attaching machine in which the inspecting apparatus 1 is incorporated will now be described with reference to FIG. 2, from which a wide variety of applications of this invention will be understood.

FIG. 2 is a schematic view showing the arrangement of constituent parts of the box attaching machine. In the box attaching machine, a movement restricting member 13 is situated in a fixed position adjacent to the upstream end of the casing 2 for restricting the extent of upstream movement of the casing 2 and the grip members 4 (shown in FIGS. 1, 6 and 7), and an ultrasonic welder 14 composed of an ultrasonic horn 14a and an anvil 14b is situated adjacent to the upstream end of the movement restricting member 13.

A pair of feed rollers 15 for forwardly feeding the fastener chain C intermittently is situated downstream of the inspecting apparatus 1, and a backward feeding unit 16 is situated upstream of the ultrasonic welder 14. The backward feeding unit 16 is located on the travelling path of the fastener tapes T and is composed of a first air cylinder 16b having a tape support member 16a on the rod end, and a second air cylinder 16d having a tape pressure member 16c on the rod end. The second air cylinder 16d is movable forwardly and backwardly on the travelling path of the fastener chain as guided in a non-illustrated locus. With the fastener chain C gripped between the tape support member 16a and the tape pressure member 16c as the second air cylinder 16d is operated, when the first air cylinder 16b is operated to expand its rod, the fastener chain C will be moved backwardly a predetermined distance.

Between the backward feeding unit 16 and the ultrasonic welder 14, there are arranged a space detector 17 for detecting an element-free space portion S to which a box P is to be attached, and a punch unit 18 downstream of the space detector 17 for forming cutaways T-1 at the element-free space portion S of opposed tapes T in order to facilitate the attaching of the box P. At a position adjacent to the ultrasonic welder 14, a box supplying unit 19 is situated for intermittently supplying successive boxes P to a welding portion of the ultrasonic welder 14. Reference numeral 20 in FIG. 2 designates a control unit. These units and devices are well known in the art, so their detailed description is omitted here. The actuation of these units and device is performed according to the procedure previously stored in the control unit 20, based on command signals from the control 20.

According to the box attaching machine of this embodiment, when the fastener chain C is fed forwardly by a length corresponding to the length of a single slide fastener by the feed rollers 15, the air cylinder 11 of the inspecting apparatus 1 of this invention is operated to expand its rod to open the upper and lower gripping tips 4a of the grip members 4, thus allowing the fastener chain C to freely travel through the inspecting apparatus 1. While the fastener chain C is fed forwardly, the space detector 17 detects an element-free space portion S to which the box is to be attached. As the detection signal is sent to the control unit 20, the punch unit 18 is operated with a predetermined time difference to form cutaways T-1 in the opposed tapes T. At this time, the feed rollers 15 are stopped, and the air cylinder 11 is operated to shrink its rod to close the upper and lower gripping tips 4a of the grip members 4, thus gripping the opposed tapes of the fastener chain C firmly. Then, the anvil 14b and the clamp 14c holding the box P supplied from the box supplying unit 19 are lowered and, at the same time, the ultrasonic horn 14a is raised to a predetermined position so that the box P is set at the welding portion of the ultrasonic welder 14 and stays at that position. When the box P is supplied to the ultrasonic welder 14, the backward feeding unit 16 is operated to backwardly feed the fastener chain C together with the inspecting apparatus 1.

As the fastener chain C is backwardly moved, the inspecting apparatus 1 holding the fastener chain C firmly is also backwardly moved. The movement restricting member 13 is situated at such a position that the box P is supplied to a position where the box pin PB and the box P can be welded together. When the inspecting apparatus 1 comes into contact with the movement restricting member 13, the backward feeding unit 16 is stopped with the fastener chain C in a predetermined tension. During this backward movement of the fastener chain C, the box P in the waiting position is threaded on the fastener tapes from the cutaways T-1 and, at the same time, the insertion pin BB and the box pin PB are inserted into the box P. Since the fastener chain C has a predetermined tension when the insertion pin BB and box pin PB are inserted into the box P, it is possible to facilitate the inserting of the insertion pin BB and box pin PB without spreading the opposed tapes horizontally at the element-free space portion. Then the ultrasonic welder 14 is operated to weld the box P and the box pin PB together.

When the box P and the box pin PB are welded together, the backward feeding unit 16 releases the gripping of the fastener chain C and, at the same time, the air cylinder 11 of the inspecting apparatus 1 becomes inoperative so that the fastener tapes T are resiliently gripped between the upper and lower gripping tips 4a under the resilience of the compression spring 10. This resilience of the spring 10 is set to such a low degree that the fastener chain C can travel between the upper and lower gripping tips 4a as it is fed by the feed rollers 15. Then the feed rollers 15 starts feeding the fastener chain C. At that time, the fastener tapes T slide between the upper and lower gripping tips 4a. During the feeding of the fastener chain C, the box P welded with the box pin PB comes into contact with the end surfaces of the grip members 4 between the horizontally opposed gripping tips 4a, thus moving the inspecting apparatus 1 forwardly together with the fastener chain C. During the moving of the inspecting apparatus 1, the head of the moving body or bolt 6 comes into contact with the head of the contact member 8 and keep moving forwardly a predetermined distance against the resilience of the compression spring 7. When the head of the bolt 6 is detected by the detector 9 as it is moved the predetermined distance, the detector 9 sends a detection signal to the control unit 20 to cause the air cylinder 11 of the inspecting apparatus 1 to expand its rod, thus spreading the upper and lower gripping tips 4a of the grip members 4 against the resilience of the compression spring 10 so that the box P can pass between the upper and lower gripping tips 4a. At that time, since the stored resilience of the compression spring 7 exerts on the head of the bolt 6, the inspecting apparatus 1 is resiliently moved backwardly via the bolt 6 and, at the same time, the fastener chain C keeps moving forwardly. The backwardly moved inspecting apparatus 1 then collides against the movement restricting member 13 and waits at that position until the next inspection.

The foregoing is the case where the attaching of the box P is complete. Assuming that the attaching of the box is incomplete, when the feed rollers 15 starts feeding the fastener chain C forwardly, the fastener tapes T slide between the upper and lower gripping tips 4a. During the feeding of the fastener chain C, when the box P welded with the box pin PB comes into contact with the end surfaces of the grip members 41, between the horizontally opposite gripping tips 4a, the non-secured box P is removed instantly from the fastener chain C. If the attachment of the box P is not firm enough, the box P with the fastener chain C is moved forwardly in contact with the inspecting apparatus 1, however, when the head of the bolt 6 comes into contact with the head of the contact member 8 during the forward moving of the box P, the box P is removed from the fastener chain C and solely the fastener chain C is fed forwardly. When the box P is thus removed from the fastener chain C, it will be detected by a non-illustrated suitable detecting means and marking will be made by a non-illustrated known marking unit before feeding to the next station.

In the above-mentioned embodiment, the box P is made of thermoplastic synthetic resin. This invention can be also applied to the case where the whole separable bottom stop assembly is made of metal. In such a case, instead of the ultrasonic welder, a clinching unit disclosed in the above-mentioned U.S. Pat. No. 4,671,122 may be used, but the clinching notches should be omitted from the box P.

As described above, according to the box attaching machine equipped with the inspect apparatus of this invention, it is possible to continuously inspect the successive boxes attached to the fastener tapes. Further, since the degree of firmness of attaching of the box is directly inspected without causing any deformation on the box surface, unlike the prior art apparatus which inspects it indirectly causing deformation on the box surface, it is possible not only to obtain very reliable inspection results but also to attach the box with excellent appearance.

What is claimed is:

1. An apparatus for inspecting attachments of bottom stop boxes attached to separable slide fasteners, comprising:

(a) a parallel pair of fastener tapes, a bottom stop box, and a pair of tape grip members movable forwardly and backwardly along a travelling path of a said pair of parallel fastener tapes, said bottom stop box attached to one tape of said pair of fastener tapes, said tape grip members being situated above and below the travelling path in confronting relationship, each of said tape grip members being pivotally movable about a horizontal axis extending through a central portion thereof, said tape grip members having urging means for urging first confronting ends of the grip members toward each other to resiliently contact with said tapes, and forced turning means for forcedly turning second confronting ends of the grip members selectively toward and away from each other to cause said first confronting ends to release said tapes, and also to grip said tapes, said first confronting ends upstream of said second confronting ends along said path of the pair of fastener tapes through the apparatus for continuously inspecting;

said first confronting ends allow said pair of tapes to pass but abut said bottom stop box, forward movement of said pair of tapes causing said bottom stop box, when attached to said one of said pair of tapes, to drive forwardly said grip members a predetermined length;

(b) a moving body situated on one side of said grip members for moving forwardly and backwardly together with said grip members;

(c) a contact member and a spring, said contact member situated in a path of movement of said moving body and normally urged by said spring from a fixed position toward said moving body by a predetermined resilience; and (d) detecting means for detecting when said moving body is moved said predetermined length against said predetermined resilience of said spring while in contact with said contact member.

2. A separable slide fastener bottom stop attaching machine equipped with the inspecting apparatus as defined in claim 1, said machine comprising:

(a) a pair of gripping tips on respective upstream ends of said grip members for gripping said pair of fastener tapes from above and below said pair of fastener tapes;

(b) a movement restricting member for restricting upstream movement of said grip members;

(c) forward feeding means situated downstream of said grip members for forwardly feeding said pair of fastener tapes intermittently;

(d) a box attaching unit situated near to and upstream of said movement restricting member for attaching said box to said one of said pair of fastener tapes;

(e) backward feeding means situated upstream of said box attaching unit; and (f) controlling means for actuating said forced turning means to cause said gripping tips to forcedly grip said pair of fastener tapes arranged therebetween while said box is supplied to said box attaching unit, for actuating said backward feeding means, and for opening said gripping tips when the box is attached to said one of said parallel pair of fastener tapes.

3. An apparatus according to claim 1, further comprising:

a forward feeding means arranged for progressing said pair of fastener tapes along a travelling path;

a box pin;

a box attaching unit situated nearto and upstream of said grip members having means for delivering said box to the travelling path, and means for securing said box to said box pin of said one of said fastener tapes, said box pin inserted into said box;

backward feeding means situated upstream of said box attaching unit, said backward feeding means for translating said pair of fastener tapes in an upstream direction to thread said box pin into said box held at said box attaching unit; and controlling means for actuating said grip members to cause said grip members to forcedly grip the pair of fastener tapes while said box is supplied to said box attaching unit, for actuating said backward feeding means, and for opening said gripping members when said box is attached to said one of said pair of fastener tapes.

4. A separable slide fastener bottom stop attaching machine equipped with an inspecting apparatus, comprising:

a plurality of fastener tapes arranged in parallel pairs and connected end to end;

a forward feeding means arranged for progressing said fastener tapes along a travelling path;

a bottom stop box to be attached to one of said tapes;

a pair of tape grip members movable forwardly and backwardly along the travelling path of said fastener tapes, said grip members being situated above and below the travelling path in confronting relationship, said tape grip members being actuatable to grip or to release one of said fastener tapes therebetween, said grip members when actuated to release allowing said one tape to pass therebetween, said grip members abutting said stop box, forward movement of said one tape causing said stop box to drive forwardly said grip members a predetermined length;

a moving body situated on one side of said grip members for moving forwardly and backwardly together with said grip members;

a contact member and a spring means, said contact member situated in a path of movement of said moving body and normally urged by said spring means from a fixed position toward said moving body by a predetermined resilience;

a box pin;

a box attaching unit situated nearto and upstream of said grip members having means for delivering said box to the travelling path, and means for securing said box to said box pin of said one of said fastener tapes, said box pin inserted into said box;

backward feeding means situated upstream of said box attaching unit, said backward feeding means for translating said fastener tapes in an upstream direction to thread said box pin into said box held at said box attaching unit;

detecting means for detecting when said moving body is moved said predetermined length against said predetermined resilience of said spring means while in contact with said contact member;

controlling means for actuating said grip members to cause said grip members to forcedly grip the fastener tapes while the box is supplied to said box attaching unit, for actuating said backward feeding means, and for opening said gripping members when the box is attached to the fastener tapes; and wherein said grip members each comprise an elongate gripping portion having a gripping tip and each being pivotally movable about a horizontal axis extending through a central portion thereof; and urging means for urging said gripping tips toward each other, and forced turning means for forcedly turning second confronting ends of the elongate gripping portions selectively toward and away from each other, said gripping tips upstream of said second confronting ends in said traveling path of the fastener tapes through the apparatus.

5. The apparatus according to claim 4, further comprising a movement restricting member for restricting an upstream movement of said grip members, upstream along said path of the fastener tapes through the apparatus, said box attaching unit situated nearto and upstream of said movement restricting member.

6. A separable slide fastener bottom stop attaching machine equipped with an inspecting apparatus, comprising:

a plurality of fastener tapes arranged in parallel pairs and connected end to end;

a forward feeding means arranged for progressing said fastener tapes along a travelling path;

a bottom stop box to be attached to one of said tapes;

a pair of tape grip members movable forwardly and backwardly along the travelling path of said fastener tapes, said grip members being situated above and below the travelling path in confronting relationship, said tape grip members being actuatable to grip or to release one of said fastener tapes therebetween, said grip members when actuated to release allowing said one tape to pass therebetween, said grip members abutting said stop box, forward movement of said one tape causing said stop box to drive forwardly said grip members a predetermined length;

a moving body situated on one side of said grip members for moving forwardly and backwardly together with said grip members;

a contact member and a spring means, said contact member situated in a path of movement of said moving body and normally urged by said spring means from a fixed position toward said moving body by a predetermined resilience;

a box pin;

a box attaching unit situated nearto and upstream of said grip members having means for delivering said box to the travelling path, and means for securing said box to said box pin of said one of said fastener tapes, said box pin inserted into said box;

backward feeding means situated upstream of said box attaching unit, said backward feeding means for translating said fastener tapes in an upstream direction to thread said box pin into said box held at said box attaching unit;

detecting means for detecting when said moving body is moved said predetermined length against said predetermined resilience of said spring means while in contact with said contact member;

controlling means for actuating said grip members to cause said grip members to forcedly grip the fastener tapes while the box is supplied to said box attaching unit, for actuating said backward feeding means, and for opening said gripping members when the box is attached to the fastener tapes; and further comprising a movement restricting member for restricting an upstream movement of said grip members, upstream along said traveling path of the fastener tapes through the apparatus, said box attaching unit situated nearto and upstream of said movement restricting member.

* * * * *